Figure 6:
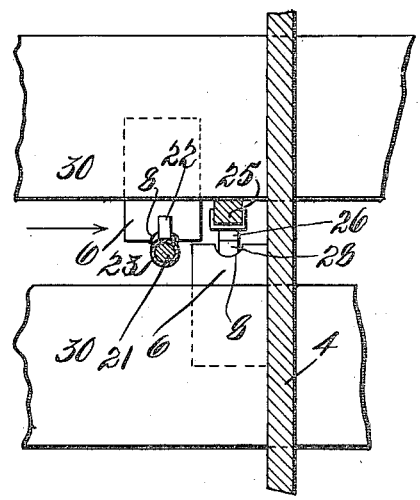

T. G. TURNER.
BRICK FOR FLAME WALLS OF WATER TUBE BOILERS.
APPLICATION FILED JAN. 28, 1909.
979,604.
Patented Dec. 27, 1910.
5 SHEETS—SHEET 1.
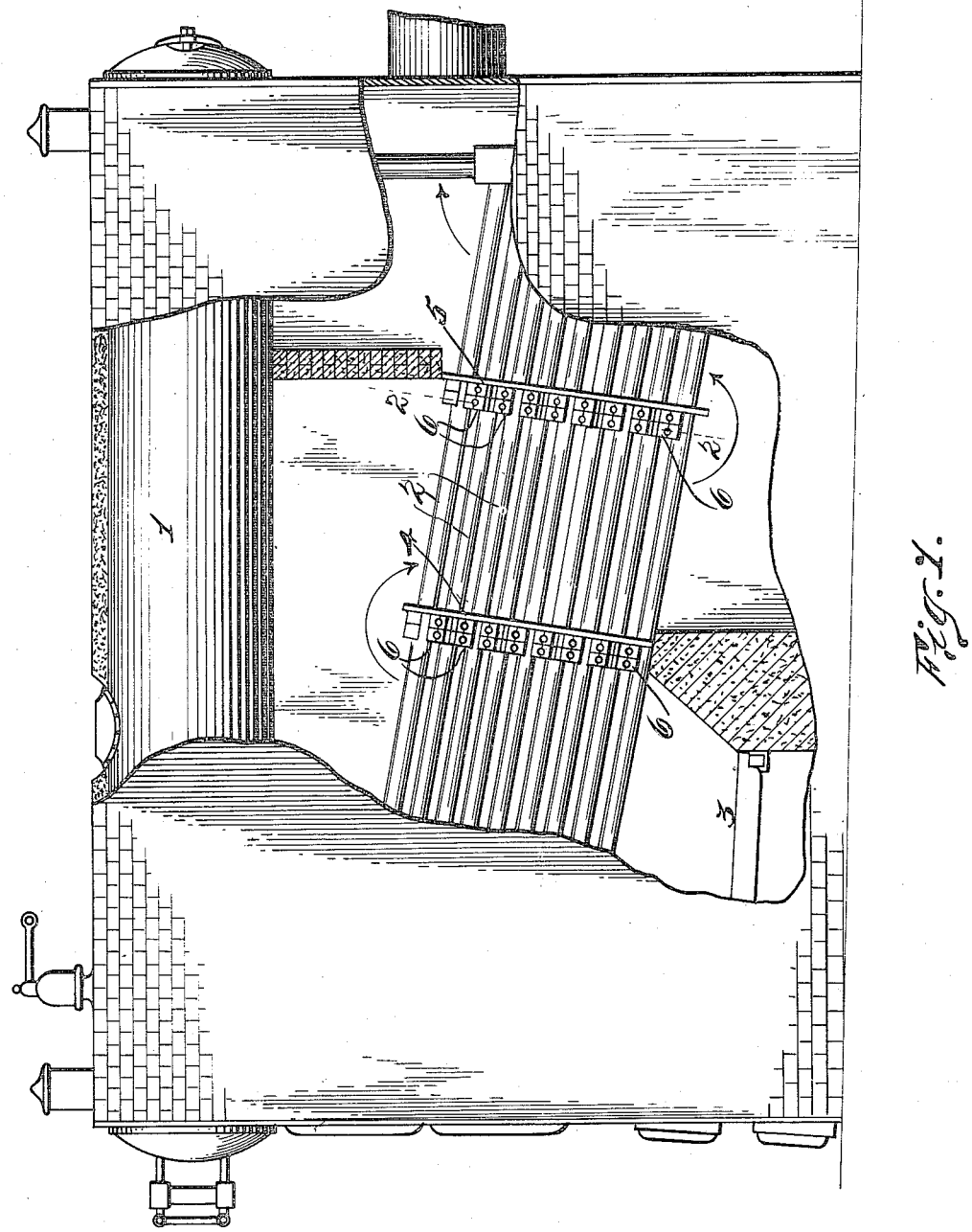
Witnesses:
C. A. Jarvis
Benjamin Oksenkrug
Inventor
Thomas G. Turner
By Christie and Wright
Attorney.

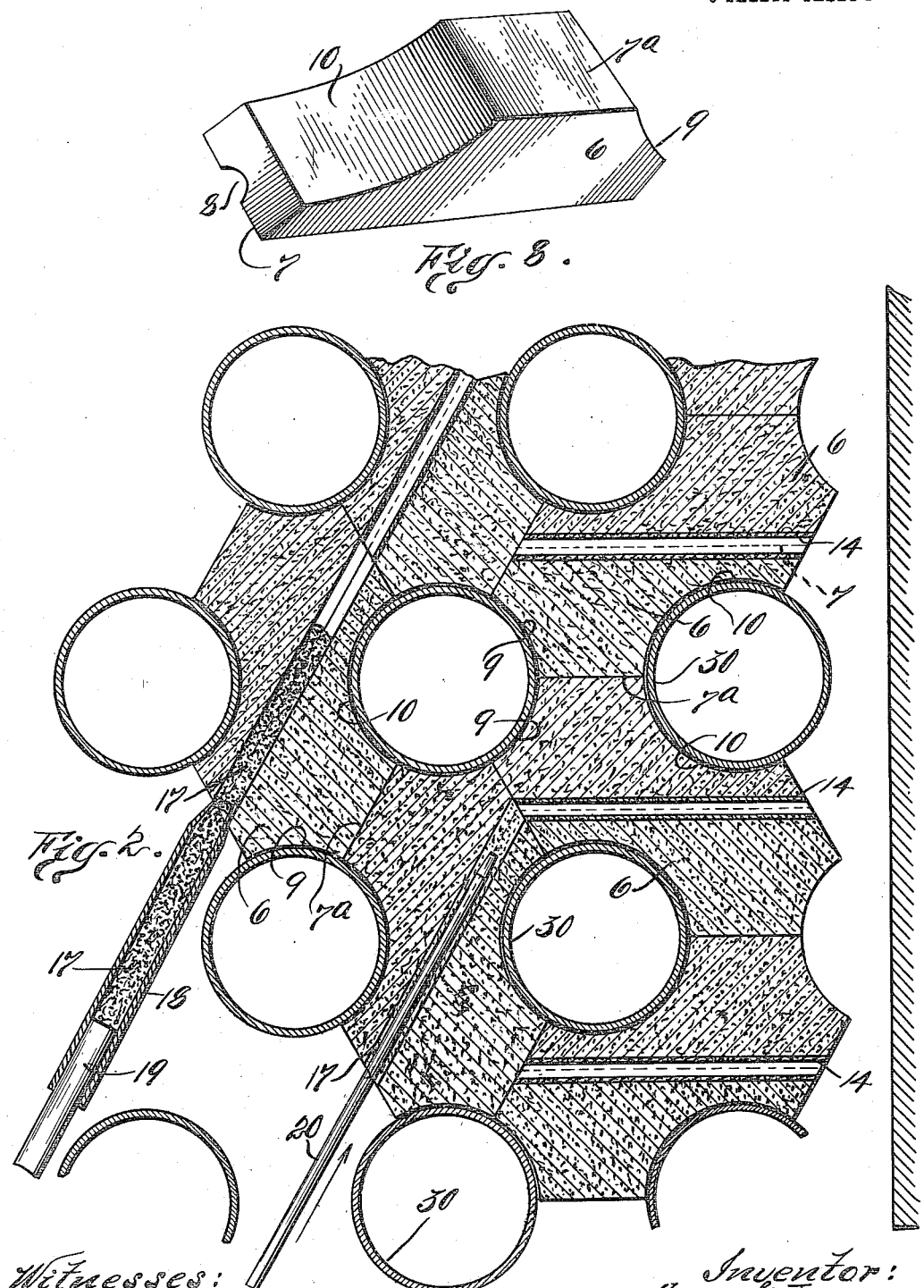

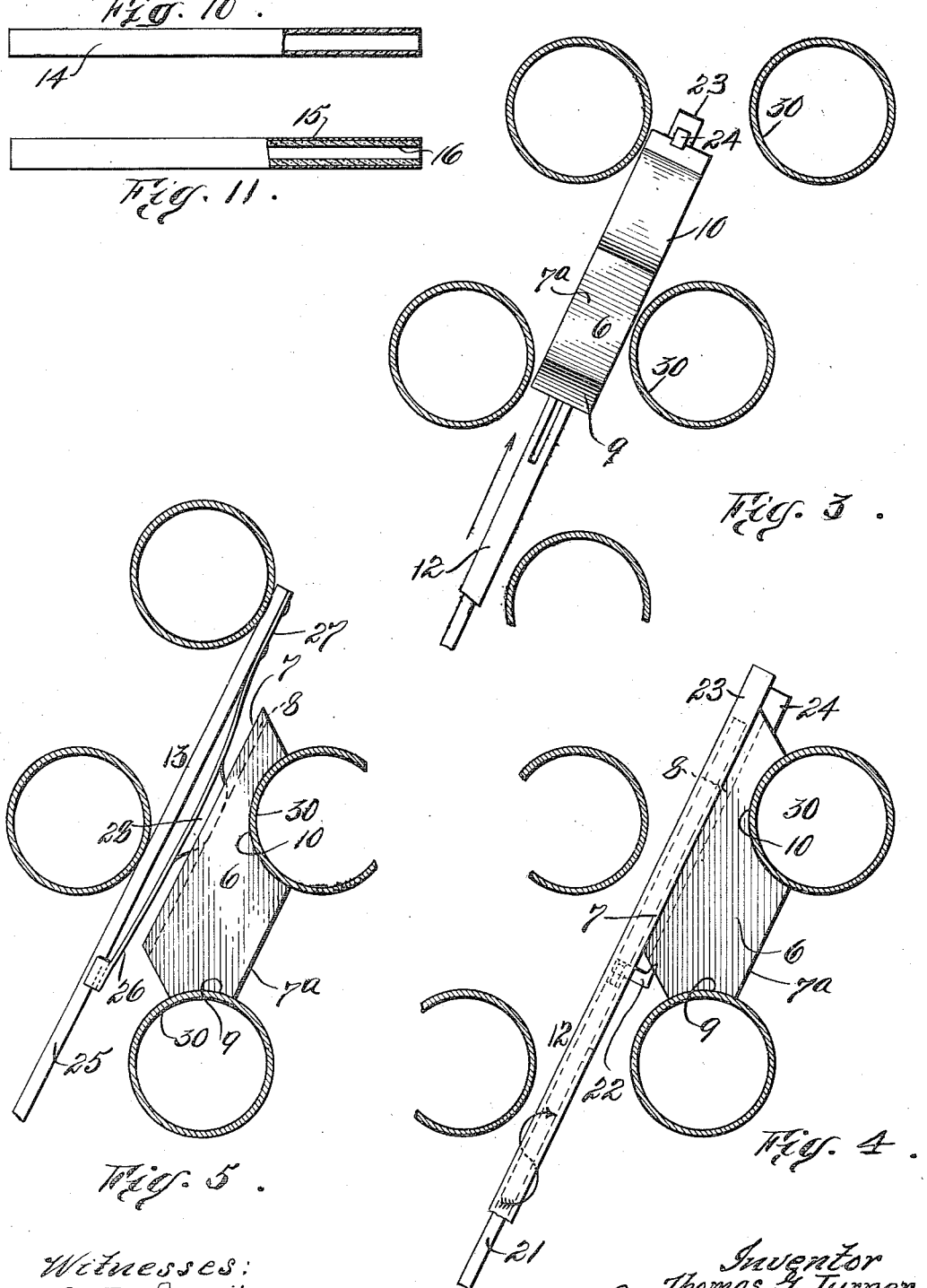

T. G. TURNER.
BRICK FOR FLAME WALLS OF WATER TUBE BOILERS.
APPLICATION FILED JAN. 28, 1909.

979,604.

Patented Dec. 27, 1910.

5 SHEETS—SHEET 4.

T. G. TURNER.
BRICK FOR FLAME WALLS OF WATER TUBE BOILERS.
APPLICATION FILED JAN. 28, 1909.

979,604.

Patented Dec. 27, 1910.
5 SHEETS—SHEET 5.

UNITED STATES PATENT OFFICE.

THOMAS G. TURNER, OF NEW YORK, N. Y., ASSIGNOR TO TURNER BAFFLE-WALL & BOILER COMPANY, A CORPORATION OF NEW YORK.

BRICK FOR FLAME-WALLS OF WATER-TUBE BOILERS.

979,604. Specification of Letters Patent. Patented Dec. 27, 1910.

Application filed January 28, 1909. Serial No. 474,765.

*To all whom it may concern:*

Be it known that I, THOMAS G. TURNER, a citizen of the United States, residing at New York city, in the borough of Manhattan, county and State of New York, have invented certain new and useful Improvements in Brick for Flame-Walls of Water-Tube Boilers, of which the following is a clear, full, and exact description.
The object of this invention is to provide a flame wall or baffle for steam boilers of the water tube type composed of nesting fire bricks, which will be easily installed originally and in repair work and provide a more perfect and more solid wall than is now secured, thereby insuring the travel of the gases of combustion across all the tubes in their travel instead of through the wall in part.
It has heretofore been suggested in United States Patent No. 808920 of January 2, 1906, to force apart every four adjacent tubes to permit a brick to be inserted sidewise between the tubes and then turned into position; so far as I am aware such device is the nearest prior art to my invention. Such spreading of the tubes however requires time and strenuous effort and does not result in a homogeneous fire wall for the bricks are chipped or broken on the edges to facilitate turning into position after location.

In carrying out my invention I provide a brick that is of a thickness which will permit it to be slid into place between a row of tubes either diagonally or at right angles to the tubes, and of a width which will permit it to be turned 90 degrees when in place without displacing the tubes. This brick is preferably provided with a long meeting face for joinder with a similar brick on a center line between two tubes and each brick is preferably provided with two curved seats for engagement with the boiler tubes. When a second similar brick has been inserted the two in appearance will be such a brick as described in the before mentioned patent except that two bricks instead of one will be located between, say for example, every four adjacent tubes. I do not however wish to limit myself to two parts between every four tubes, but it will be essential to have at least two parts between opposite rows of tubes diagonal or straight.
The bricks may however extend in long strips, at least two strips between each row, meeting preferably in the center line between the tubes. After my bricks are in position I preferably secure them together for which purpose the long meeting faces of the opposed bricks are provided with open grooves, preferably forming a circular opening between the bricks when they are in place. Into this space I insert a filler to join and secure the two bricks. This filler may be a core or tube of refractory material or a thin metal tube with a refractory tube inside of the same, or I may force plastic clay into the groove by piston pressure, in which case I prefer to pass a rod through the clay after insertion to make it tubular. I prefer to make the filler in this manner that it may push the bricks of different sets into close contact and itself be capable of giving way if necessary upon unusual expansion of the tubes under heat. It will be obvious that the plastic clay will become hard in the heat of the furnace.

The scope of my invention will be pointed out in the claims.

Figure 7:
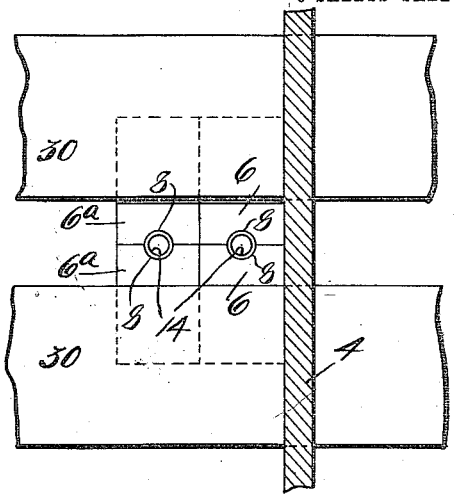
Figure 9:
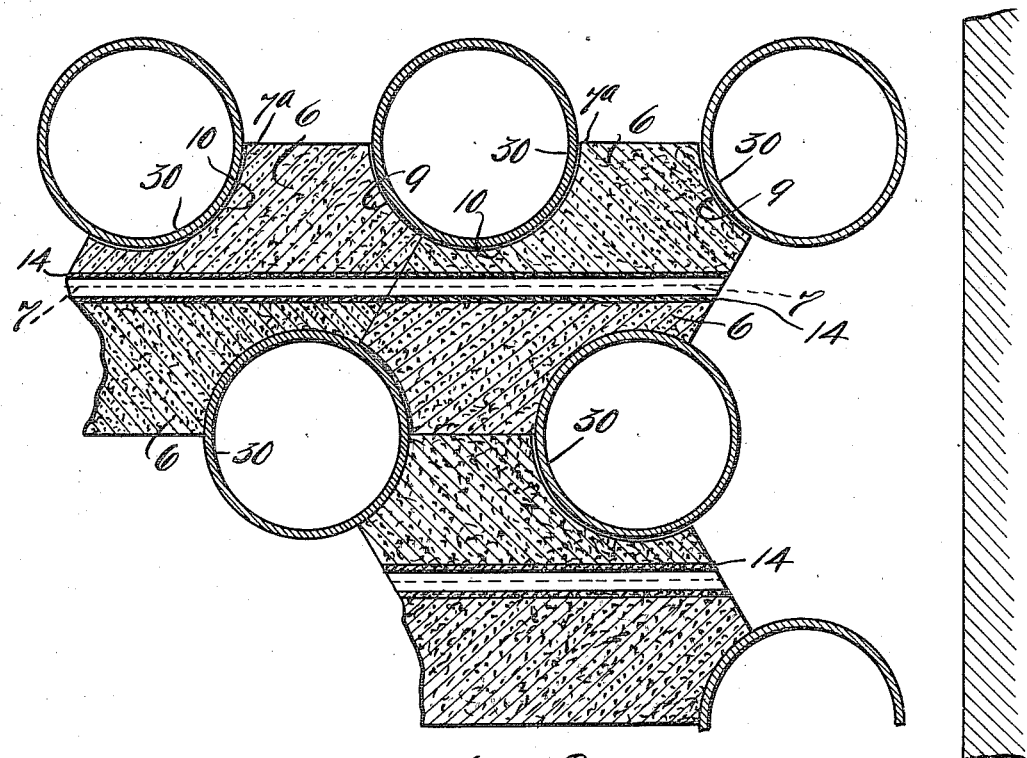
Figure 12:
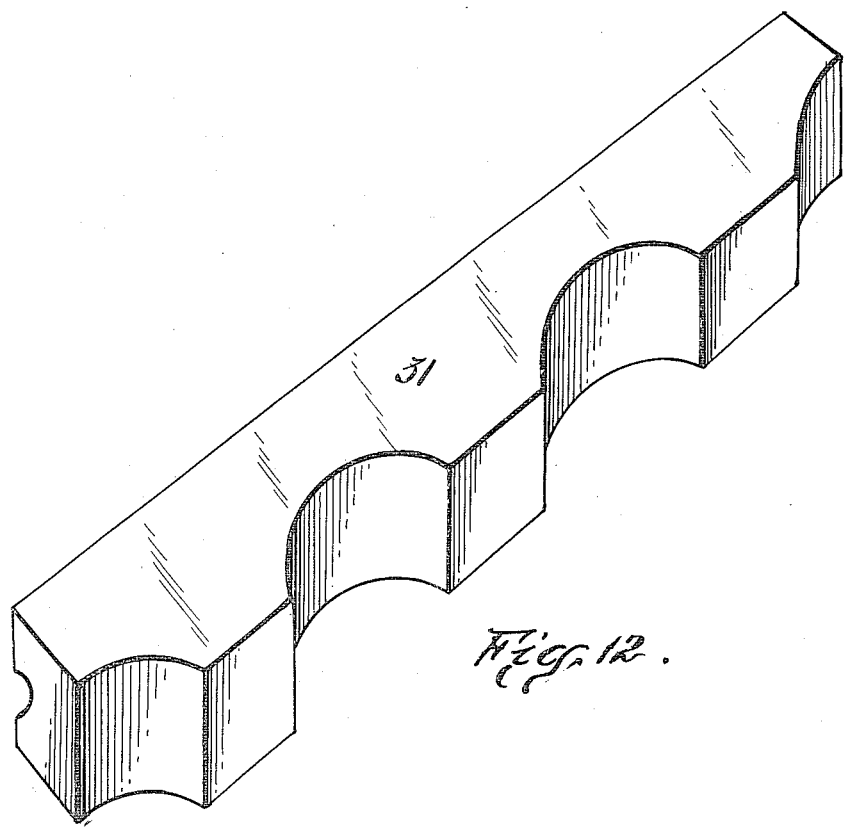

In the accompanying drawings, Figure 1 is a side elevation with the wall broken away of a water tube boiler provided with flame walls of my invention. Fig. 2 is a transverse section of ten tubes of said boiler drawn to an enlarged scale on line 2—2 Fig. 1. Fig. 3 is a detail showing how a brick is inserted into place between the rows of tubes. Fig. 4 is a similar view showing the carrier turned 90 degrees from Fig. 3 to place the brick in place against the tubes. Fig. 5 shows a holder for holding the brick in place before its companion brick is inserted. Fig. 6 is a detail at right angles to Fig. 5, showing the second brick being inserted. Fig. 7 is a view similar to Fig. 6 showing two rows of bricks in place. Fig. 8 is a perspective view of my preferred form of brick. Fig. 9 is a view similar to Fig. 2, showing a modified form of brick. Fig. 10 is a side elevation partly in section of one type of filler. Fig. 11 is a similar view of another type of filler, and Fig. 12 is a perspective view of a modified ship form of fire brick.

In the drawings, Fig. 1; 1 is the steam drum, 2 are the water tubes, 3 the grate bars, 4 and 5 the baffle or flame wall frames of usual construction of a Babcock and Wilcox boiler. The arrows show the direction of the travel of the products of combustion. In order to properly deflect the gases flame walls 5, generally two thicknesses of brick are provided. According to this invention the walls 5 are made of a multitude of nesting bricks such as 6 shown in perspective in Fig. 8. The brick 6 has one long meeting face 7 with a semicircular groove 8 thereupon, a shorter parallel meeting face 7ª, and two curved surfaces 9 and 10, the smaller curved surface 9 being adapted to rest on a tube 30 either below or above the brick and the curved surface 10 being adapted to rest against a tube at one side of the brick, such curves forming seats for the bricks and preferably being of a different radius to the tubes.

To place the brick 6 in place, it is first grasped by a tool 12 (see Figs. 3 and 4) inserted upward from the fire box between a diagonal row of tubes sidewise, as shown in Fig. 3 until the tool comes into the position as to height shown in Fig. 4 when the tool will be rotated 90 degrees to drop the brick 6 into place as shown in Fig. 4. The tool may then be removed and a spring clamp tool 13 Fig. 5 inserted to hold the brick in place if desired. A second brick 6 with the curved surface 9 upward is then inserted by the tool 12 and turned oppositely from the turning of the first brick, (see Fig. 6) which shows one brick held by clamp 13 and the second being slid into place, after turning, by the tool 12. When the bricks have been inserted as shown in Fig. 6, the clamp 13 is removed and the two meeting surfaces 7 brought together so that the opposed semicircular grooves 8 will form a tube. In such condition a tube 14 of fire clay or asbestos or a metal tube 15 with a refractory lining 16 may be inserted between the bricks to fill the groove and lock the bricks together. Or, I may fill the tube between the bricks with plastic clay 17, (see Fig. 2) squeezing it out of a barrel 18 by means of a piston 19 and thus forcing the bricks of one set apart so that a close joint can be made with bricks of adjoining sets. This spreading can be augmented by passing a pointed mandrel 20 through the plastic clay 17 as shown in Fig. 2, at the same time producing a tube which will give way before the bricks under undue expansion of the tubes 30. The plastic clay becomes hard and vitrified in the heat of the furnace.

In Fig. 7 two rows of bricks 6 and 6ª are shown. This figure also illustrates how the flame plate 4 supports the backs of the bricks.

As shown in Fig. 2 the bricks 6 for the side of the flame wall are preferably inserted sidewise to get proper support for the same. I have shown the same shape of brick for such side but if desired special shapes could be used to overcome the uneven edge presented in this view. In Fig. 9 all the bricks are inserted sidewise. The tool 12 is shown as a rod 21 having a pointed projection 22 thereon. A tube 23 slides over the rod 21 and has a projection 24 at its end. The projections can be moved with relation to each other and constitute merely an ordinary vise or clamp for the brick. The tool 13 is but a long rod 25 provided with a spring plate 26 secured at 27 and having an abutment 28 to press into the groove 8 of a brick. When the second brick is in the position of Fig. 6 this tool can be withdrawn without displacing the first brick.

As shown in Fig. 12, the brick 31 is but a number of the bricks 6 of Fig. 8 in one long strip which if long enough can be pushed into place without the use of any tool.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense. It is furthermore desired to be understood that the language used in the following claims is intended to cover all the generic and specific features of the invention herein described, and all statements of the scope of the invention which as a matter of language might be said to fall therebetween.

I claim as my invention:

1. A water tube boiler having boiler tubes arranged in parallel series or rows, a flame wall composed of bricks arranged transversely of said tubes, a brick thereof having curved recesses in one edge adapted to be seated upon adjacent tubes of a row, said brick having an edge which terminates short of the tubes of an adjacent row, a similarly shaped brick of said wall adapted to contact adjacent tubes of said adjacent row having an edge which adjoins the last mentioned edge of the first brick, one line of separation between adjacent bricks that contact with adjacent rows of tubes passing within the space between adjacent rows, the other lines of separation being lines that connect centers of tubes of parallel rows.

2. A water tube boiler having boiler tubes arranged in parallel series or rows, a flame wall composed of bricks arranged transversely of said tubes, a brick thereof having curved recesses in one edge adapted to be seated upon adjacent tubes of a row, said brick having an edge which terminates short of the tubes of an adjacent row, a similarly shaped brick of said wall adapted to contact adjacent tubes of said adjacent row having an edge which adjoins the last mentioned edge of the first brick, one line of separation between adjacent bricks that contact with adjacent rows of tubes passing within the space between adjacent rows, the other lines of separation being lines that connect centers of tubes of parallel rows, said first meeting edges having grooves therein and a filler in said groove.

3. A water tube boiler having boiler tubes arranged in parallel series or rows, a flame wall composed of bricks arranged transversely of said tubes, a brick thereof having curved recesses in one edge adapted to be seated upon adjacent tubes of a row, said brick having an edge which terminates short of the tubes of an adjacent row, a similarly shaped brick of said wall adapted to contact adjacent tubes of said adjacent row, having an edge which adjoins the last mentioned edge of the first brick, one line of separation between adjacent bricks that contact with adjacent rows of tubes passing within the space between adjacent rows, the other lines of separation being along lines that connect centers of tubes of parallel rows, said first meeting edges having grooves therein and a filler in said groove, said filler being a tube.

4. In combination with the water tubes, and flame plate of a water tube boiler, a plurality of bricks within the space between a plurality of adjacent tubes and a filler forced between two bricks whereby they may be spread apart to be firmly seated upon adjacent tubes.

Signed at New York city this 26th day of January 1909.

THOMAS G. TURNER.

Witnesses:
 EDWARD A. JARVIS,
 F. WARREN WRIGHT.